(12) United States Patent
Dong et al.

(10) Patent No.: US 12,230,810 B2
(45) Date of Patent: Feb. 18, 2025

(54) SECONDARY BATTERY AND APPARATUS CONTAINING THE SAME

(71) Applicant: CONTEMPORARY AMPEREX TECHNOLOGY (HONG KONG) LIMITED, Hong Kong (CN)

(72) Inventors: Xiaobin Dong, Ningbe (CN); Jiazheng Wang, Ningde (CN); Meng Kang, Ningde (CN); Libing He, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 527 days.

(21) Appl. No.: 17/544,944

(22) Filed: Dec. 8, 2021

(65) Prior Publication Data
US 2022/0102788 A1   Mar. 31, 2022

Related U.S. Application Data

(63) Continuation of application No. PCT/CN2020/083055, filed on Apr. 2, 2020.

(51) Int. Cl.
*H01M 50/103* (2021.01)
*H01M 4/587* (2010.01)
*H01M 4/02* (2006.01)

(52) U.S. Cl.
CPC ......... *H01M 50/103* (2021.01); *H01M 4/587* (2013.01); *H01M 2004/021* (2013.01); *H01M 2004/027* (2013.01); *H01M 2220/20* (2013.01)

(58) Field of Classification Search
CPC ....... H01M 10/0525; H01M 2004/021; H01M 2004/027; H01M 2220/20; H01M 4/131;
(Continued)

(56) References Cited

U.S. PATENT DOCUMENTS

2018/0331354 A1   11/2018   Kim et al.
2019/0157664 A1   5/2019   Yamamoto et al.

FOREIGN PATENT DOCUMENTS

CN   104779413 A   7/2015
CN   108169683 A   6/2018
(Continued)

OTHER PUBLICATIONS

The First Office Action for JP Application No. 2022-532690, dated Jun. 5, 2023, 8 pages.
(Continued)

*Primary Examiner* — Victoria H Lynch
(74) *Attorney, Agent, or Firm* — East IP P.C.

(57) ABSTRACT

This application discloses a secondary battery and an apparatus containing the secondary battery. The secondary battery secondary battery includes an electrode assembly including a cell and tabs extending from the cell, the cell includes a negative electrode plate, the negative electrode plate includes a negative current collector and a negative electrode film arranged on at least one surfaces of the negative current collector and including a negative active material, wherein the negative active material includes artificial graphite including secondary particles; and the cell satisfies 5 cm$\leq 0.5 \times \sqrt{a^2+b^2} \leq 15$ cm, and a$\leq 15$ cm, wherein a is the maximum size of the cell in the direction that the tabs extend, in cm; and b is the maximum size of the cell in a direction perpendicularly intersecting with the direction that the tabs extend, in cm.

20 Claims, 4 Drawing Sheets

(58) Field of Classification Search
CPC ...... H01M 4/133; H01M 4/366; H01M 4/505;
H01M 4/525; H01M 4/583; H01M 4/587;
H01M 50/103; H01M 50/209; H01M
50/557; Y02E 60/10
See application file for complete search history.

(56) References Cited

FOREIGN PATENT DOCUMENTS

| | | | |
|---|---|---|---|
| CN | 108 878773 A | 11/2018 |
| CN | 108878956 A | 11/2018 |
| CN | 109461934 A | 3/2019 |
| CN | 208603718 U | 3/2019 |
| CN | 109704323 A | 5/2019 |
| CN | 110265625 A | 9/2019 |
| EP | 3279976 A1 | 2/2018 |
| JP | H1154123 A | 2/1999 |
| JP | 2007149656 A | 6/2007 |
| JP | 2011238504 A | 11/2011 |
| JP | 2013164915 A | 8/2013 |
| JP | 2014056716 A | 3/2014 |
| JP | 2015011919 A | 1/2015 |
| JP | 2016109654 A | 6/2016 |
| JP | 2018073644 A | 5/2018 |
| KR | 20170134453 A | 12/2017 |
| KR | 20180125235 A | 11/2018 |
| WO | 2002059040 A1 | 8/2002 |
| WO | 2016157370 A1 | 10/2016 |

OTHER PUBLICATIONS

The International Search Report for PCT Application No. PCT/CN2020/083055, dated Dec. 29, 2020, 13 pages.
The Communication pursuant to Article 94(3) EPC for Europe an Application No. 20928386.0, dated Oct. 21, 2022, 7 pages.
The First Office Action for India Application No. 202227029222, dated Nov. 16, 2022, 6 pages.
The extended European search report for European Application No. 20928386.0, dated May 30, 2022, 8 pages.
The Second Office Action for JP Application No. 2022-532690, dated Dec. 4, 2023, 8 pages.
The extended European search report for European Application No. 23189265.4, dated Dec. 15, 2023, 9 pages.
The notice to grant patent for Japanese Application No. 2022-532690, dated Jul. 1, 2024, 6 pages.
The First Office Action for Korean Application No. 10-2022-7018362, dated Sep. 5, 2024, 13 pages.

SECONDARY BATTERY AND APPARATUS CONTAINING THE SAME

CROSS-REFERENCE TO RELATED APPLICATION

This application is a continuation of International Application No. PCT/CN2020/083055, filed on Apr. 2, 2020, which is incorporated herein by reference in its entirety.

TECHNICAL FIELD

The present application belongs to the technical field of secondary batteries, and particularly, relates to a secondary battery and an apparatus containing the same.

BACKGROUND

Secondary batteries are reversibly charged and discharged mainly by the reciprocating movement of active ions between the positive and the negative electrodes. The secondary battery is widely used in various consumer electronic products and electric vehicles because of the advantages of having high energy density, high output voltage, good safety, no pollution, no memory effect, etc. Moreover, with the increasing popularity of electric vehicles, the demand for secondary battery will show explosive growth.

As the application of secondary battery becomes wider, the consumers' demands for the secondary battery increase. However, it is still difficult to solve the problem of maintaining higher energy density of the secondary battery while achieving better other properties such as electrochemical properties in the development of the current secondary battery.

SUMMARY

In a first aspect, the present application provides a secondary battery that includes an electrode assembly, the electrode assembly including a cell and tabs extending from the cell, the cell including a negative electrode plate, the negative electrode plate including a negative current collector and a negative electrode film arranged on at least one surfaces of the negative current collector and including negative active material, wherein the negative active material includes artificial graphite which includes secondary particles; and the cell satisfies $5 \text{ cm} \leq 0.5 \times \sqrt{a^2+b^2} \leq 15 \text{ cm}$, and $a \leq 15 \text{ cm}$, wherein a is the maximum size of the cell in the direction that the tabs extend, in cm; and b is the maximum size of the cell in a direction perpendicularly intersecting with the direction that the tabs extend, in cm.

In a second aspect, the present application provides an apparatus including the secondary battery according to the first aspect of the present application.

The present application has, among others, the following advantages over the prior art:

Surprisingly, it is found that since the negative active material of the secondary battery provided in the present application includes artificial graphite including secondary particles aggregated from primary particles, and the cell meets specific size design, the secondary battery has higher energy density, and simultaneously has better fast charging performance and longer cycle life. More preferably, the battery has better high-temperature storage performance.

The apparatus according to the present application includes the secondary battery, and thus has, among others, advantages identical to the secondary battery.

DESCRIPTION OF THE DRAWINGS

In order to illustrate the technical solutions of the embodiments according to the present application more clearly, herein below, the drawings mentioned in the embodiments according to the present application will be briefly described. Apparently, the drawings as described below are only some of the embodiments according to the present application. For those of ordinarily skilled in the art, other drawings can be obtained based on the accompanied drawings, without paying any inventive labor.

DETAILED DESCRIPTION

Figure 1:
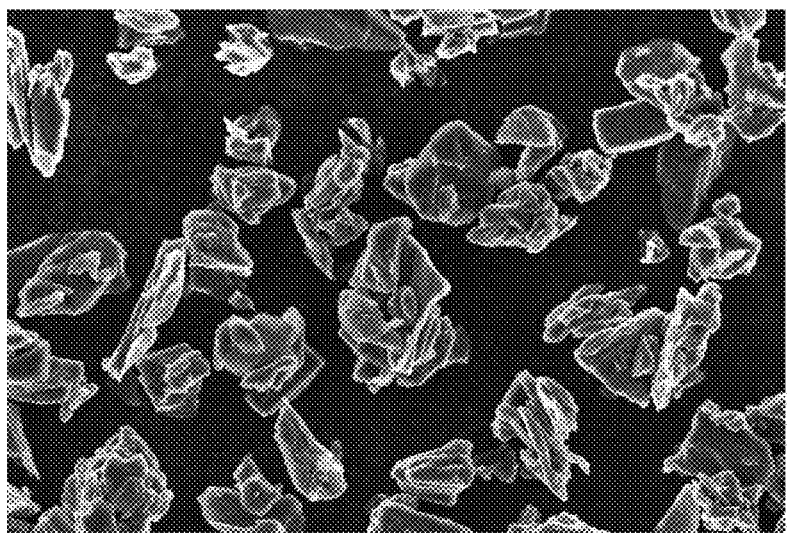
FIG. 1 is a scanning electron microscope (SEM) image of the negative active material according to one embodiment.

In order to make the purpose of the invention, technical solutions, and beneficial technical effects according to the present application more clear, herein below, the present application will be further described in detail with reference to examples. It should be understood that the examples described in the present description are only intended to explain the application, but not to limit the application.

For simplicity, only some numerical ranges are explicitly disclosed herein. Nevertheless, any lower limit may be combined with any upper limit to form an unspecified range. Moreover, any lower limit may be combined with other lower limits to form an unspecified range; likewise, any upper limit may be combined with any other upper limit to form an unspecified range. In addition, although it is not explicitly recited, each point or single value between the end points of a range is included in the range. Therefore, each point or single value, as the lower limit or upper limit thereof, may be combined with any other point or single value, or with other lower limit or upper limit, to form a range that is not explicitly specified.

In the description herein, it should be noted that, unless otherwise specified, a numeric range described with the terms "no less than" and "no more than" comprises all numbers within that range including the endpoints, and "more" in "one or more" means two or more than two.

The above-stated summary of the invention is not intended to describe each embodiment or implementation disclosed in this application. The following description illustrates exemplary embodiments more specifically. In many places throughout the application, guidance is provided by means of a series of embodiments, which can be applied in various combinations. In each embodiment, the enumeration is only a representative group and should not be interpreted as exhaustive.

Secondary Battery

During the charging and discharging of secondary battery, the electrolyte solution may be expelled and flow back to the pores of the film with the expansion and contraction of the active material, which phenomenon is called "breathing phenomenon" of the film. Because of the significant changes of the interlayer spacing of the negative material during the intercalation and deintercalation of active ions, the "breathing phenomenon" is especially evident in the negative electrode film.

After the electrolyte solution is expelled out of the film, it may take some time for the electrolyte solution to flow back into the pores of the film, thus during this process a phenomenon called "disturbed breathing" may occur. As a result, there would be the problems that the active ions are reduced to precipitate on the surface of the film owing to poor local infiltration of the film, and the conductivity of active ions deteriorates. This would directly affect the electrochemical performance of the battery.

After conducting a lot of researches, the applicants have found that "good breathing" could be effectively ensured during the cycling of the battery by using specific negative active material and by reasonably designing the size parameters of the cell. As a result, the secondary battery has higher energy density, and simultaneously has better fast charging performance and longer cycle life. Furthermore, the battery has better high-temperature storage performance.

Therefore, the first aspect of the present application provides a secondary battery, comprising an electrode assembly which comprises a cell and tabs extending from the cell, the cell comprises a negative electrode plate, the negative electrode plate comprises a negative current collector and a negative electrode film arranged on at least one surfaces of the negative current collector and comprising negative active material, wherein the negative active material comprises artificial graphite comprising secondary particles; and the cell satisfies 5 cm≤$0.5 \times \sqrt{a^2+b^2}$≤15 cm, and a≤15 cm, wherein a is the maximum dimension of the cell in the direction that the tabs extend, in cm; and b is the maximum dimension of the cell in a direction perpendicularly intersecting with the direction that the tabs extend, in cm.

Figure 2:
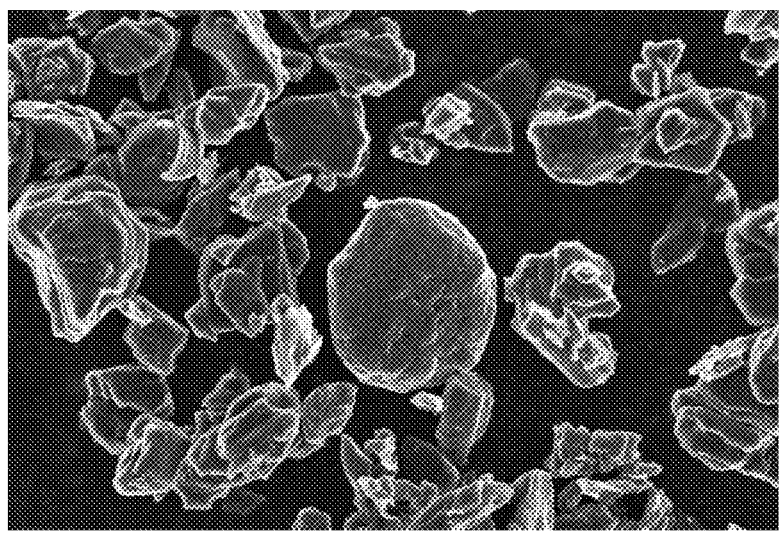
FIG. 2 is a SEM image of the negative active material according to another embodiment.

In the present application, "secondary particles" have a meaning well-known in the art, referring to particles in agglomerated state formed by the aggregation of two or more primary particles, as shown in FIGS. 1 and 2.

In the present application, the cell may have a winded structure formed by a winding a positive electrode plate, a negative electrode plate and a separator, or may have a laminated structure formed by a laminating a positive electrode plate, a negative electrode plate and a separator, wherein the separator is positioned between the positive and negative electrode plates to have function of isolation. The electrode assembly also comprises two tabs extending from the cell (i.e. the positive electrode tab and the negative electrode tab). Generally, the positive active material is coated on the coating area of the positive electrode plate, and the positive electrode tab is formed from a plurality of stacked uncoated areas extending from the coating area of the positive plate; and the negative active material is coated on the coating area of the negative electrode, and the negative electrode tab is formed from a plurality of stacked uncoated areas extending from the coating area of the negative electrode plate. Further, the two tabs can be respectively electrically connected to the corresponding electrode terminals (which can be arranged on the top cover of the battery outer package) via the adapter sheet, so as to conduct the electric energy of the cell out.

Figure 3:
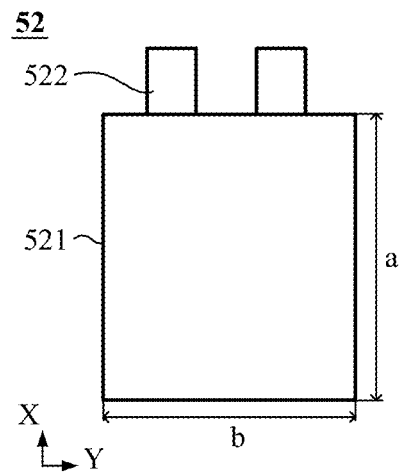
FIG. 3 shows sizes a and b of the cell according to one secondary battery.
Figure 4:
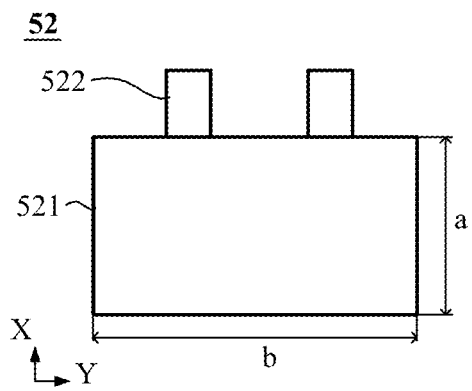
FIG. 4 shows sizes a and b of the cell according to another secondary battery.
Figure 5:
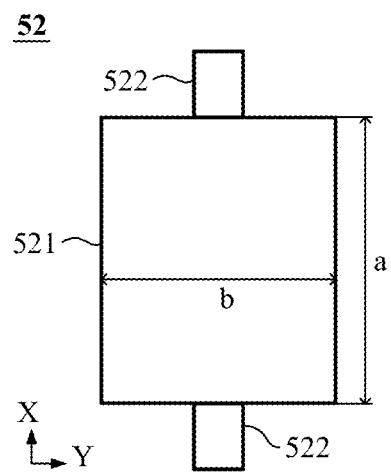
FIG. 5 shows sizes a and b of the cell according to another secondary battery.

The two tabs may extend from the same side of the cell, or may extend from opposite sides of the cell. FIGS. 3 and 4 exemplarily show two different electrode assemblies 52, respectively, wherein two tabs 522 extend from the same side of the cell 521. FIG. 5 exemplarily shows another electrode assembly 52, wherein two tabs 522 extend from opposite sides of the cell 521. a is the maximum size of the cell 521 in the direction in which the tabs 522 extend (X direction in the figs); b the maximum size of the cell 521 in the direction perpendicularly intersecting with the direction in which the tabs 522 extend (Y direction in the figs).

In the secondary battery according to the present application, $0.5 \times \sqrt{a^2+b^2}$ (denoted as R) characterizes the longest path through which the electrolyte solution flows back to the negative electrode film. The inventors have found that the energy density of the secondary battery increases with the increase of R or the sizes a and b of the cell provided that other conditions are the same. Moreover, when R is larger, the battery would undergo certain temperature rise during charging, as a result, the battery has reduced electrochemical impedance and improved conductivity of active ions, and thus fast charging performance of the battery can be improved. However, if R or a and b are too large, the electrolyte solution is difficult to flow back to infiltrate the negative electrode film. Thus, active ions are likely reduced to precipitate on the surface of the film. Consequently, the fast charging performance would be affected, the cycle life and high-temperature storage performance of the secondary battery are reduced. Through a lot of studies, the inventors have further discovered that under the condition that the negative active material comprises artificial graphite wherein the artificial graphite comprises secondary particles, and under the condition that the size of the cell is controlled within a certain range, the pore structure in the negative electrode film can be effectively improved and the flow-back resistance to the electrolyte solution can be reduced, when the secondary battery have a higher percentage of active material and undergoes proper temperature rise during charging. At the same time, a reasonable combination of the above two conditions may render effectively reduce expansion of cell during fast charging and discharging of the battery. As a result, the battery has higher energy density, and simultaneously has further improved fast charging performance and effectively improved cycle performance. Furthermore, the combination of the above two conditions may allow to solve the problem of excessively high local SOC (State of Charge) of the cell caused by poor infiltration of electrolyte solution, so as to improve the high-temperature storage performance of the battery. Therefore, the secondary battery of the present application has higher energy density, and simultaneously has better fast charging performance and longer cycle life. Furthermore, the battery has better high-temperature storage performance.

In addition, the negative electrode film has good performance in flow-back of the electrolyte solution and infiltration by the electrolyte solution, and thus has good transport performance of active ions. As a result, the reduction of active ions to precipitation on the surface of the negative electrode film (such as lithium precipitation) is reduced, so that the battery may have high safety performance.

In some preferred embodiments, the cell satisfies 7 cm≤R≤15 cm, and preferably 9 cm≤R≤13 cm. For example, the cell satisfies R=8 cm, 8.5 cm, 9 cm, 9.5 cm, 10 cm, 10.5 cm, 11 cm, 11.5 cm, 12 cm, 12.2 cm, 12.5 cm, 12.8 cm, 13 cm, 13.5 cm, 14 cm or 14.5 cm. The size designs of the cell are optimized to allow better combination of energy density with fast charging performance and cycle life of the secondary battery.

In some preferred embodiments, 6 cm≤a≤13 cm; more preferably, 7 cm≤a≤12 cm. For example, a may be 6.5 cm, 7 cm, 8 cm, 8.5 cm, 9 cm, 9.5 cm, 10 cm, 10.2 cm, 10.5 cm, 11 cm, 11.5 cm, 12 cm, or 12.5 cm.

The inventors have found that when a falls within the given range, the electrolyte solution infiltration of the entire area of the negative electrode film including the central area can be further improved, so that the electrolyte solution can easily infiltrate and flow back into the entire negative electrode film. As a result, the cycle life of secondary battery is further improved. Moreover, a that falls within an appropriate range allows higher effective height of positive and negative electrode films on the premise of ensuring normal welding of the tabs, which is beneficial to increasing the percentage of the positive and negative active materials in the entire battery; thus the battery may have a higher energy density. Furthermore, when a gradually increases within the above-mentioned range, the battery can have suitable temperature rise during charging and discharging, and thus can have further improved fast charging performance.

In some preferred embodiments, the width b of the cell satisfies 10 cm≤b≤35 cm; preferably, 18 cm≤b≤25 cm; more preferably, 20 cm≤b≤24 cm. For example, b may be 15 cm, 17 cm, 19 cm, 20 cm, 21 cm, 22 cm, 23 cm, 24 cm, 25 cm, 27 cm, or 30 cm.

The inventors have further found that controlling the width of the cell within an appropriate range would be beneficial for electrolyte solution to uniformly infiltrate and flow back to the entire negative electrode film, thus preventing active ions from being reduced to precipitate on the surface of central area of the negative electrode film owing to infiltration difficulty during fast charging and discharging. Moreover, it could avoid interface wrinkling resulting from repeated shrinkage and expansion of the negative electrode film during charging, so as to further improve the fast charging performance and cycle life of the secondary battery. In addition, when the width of the cell falls within an appropriate range, increased lateral space utilization rate of the cell is allowed, so that the battery has higher energy density.

In some preferred embodiments, the height a and the width b of the cell satisfy 0.3≤a/b≤0.8. Preferably, 0.35≤a/b≤0.7. More preferably, 0.4≤a/b≤0.6. For example, a/b=0.3, 0.35, 0.4, 0.42, 0.45, 0.46, 0.48, 0.5, 0.55, 0.6, or 0.65.

The inventors have found that when a/b falls within an appropriate range, the electrolyte solution may be less affected by the gravity thereof, which is beneficial to its uniform infiltration in the cell. Moreover, the appropriate value of a/b allows balanced expansion and contraction of the negative electrode plate in the horizontal and vertical directions during the fast charging and discharging, which is beneficial to stabilizing the interface of the plate. Therefore, the fast charging performance and cycle life of the secondary battery are further improved.

In the secondary battery according to the present application, the negative active material comprises the artificial graphite which comprises secondary particles. Thus, the pore structure inside the negative electrode film is improved, and at the same time the negative electrode plate has a higher solid phase diffusion of active ions. In particular, the secondary particles could disperse in different directions in the cyclic expansion during charging and discharging, and thus the negative electrode film is allowed to maintain good pore structure and has small cyclic expansion force. As a result, the resistance to the electrolyte solution to be expelled from the negative electrode film and to flow back to the negative electrode film is significantly reduced. Therefore, the fast charging performance and cycle performance of the secondary battery are improved correspondingly.

In some preferred embodiments, the numeric percentage S of the secondary particles in the artificial graphite satisfies 20%≤S≤100%; more preferably, S≥30%; especially preferably, S≥50%. For example, the numeric percentage S of the secondary particles in the artificial graphite may be 40%, 45%, 50%, 55%, 60%, 65%, 70%, 75%, 80%, 90% or 100%. While the negative electrode plate undergoes pressure (such as cold pressing or cyclic expansion force), the secondary particles may have a function of well supporting pores so as to effectively prevent the slip of particles, which would otherwise result in locally closed pores of the negative electrode film and especially closed pores on the surface of the negative electrode film. Therefore, the pores inside the porous plate may be maintained unobstructed, so that the negative electrode plate maintains high liquid phase conductivity of active ions. The fast charging performance and cycle performance of battery may be further improved. However, after further researches, the inventors have further found that as the amount of secondary particles increases, the negative active material will have a lot of newly increased interfaces during the cold pressing of the plate. Accordingly, the side reactions between the negative active material and the electrolyte solution would increase, which would affect the high-temperature storage performance of the battery to some extent. Therefore, in order to improve the above three properties in a balanced way, it is most preferable that 50%≤S≤80%.

After deep research, the inventors have found that when the negative active material used in the secondary battery of the present application comprises artificial graphite, the artificial graphite comprises secondary particles, and at the same time the cell have specific size design, the performance of the secondary battery would be further improved, provided that the artificial graphite further satisfies one or more of the following parameters.

In some preferred embodiments, the average particle size $D_v50$ of the artificial graphite satisfies 6 μm≤$D_v50$≤15 μm. Preferably, 8 μm≤$D_v50$≤13 μm, and more preferably, 10 μm≤$D_v50$≤12.5 μm. Under the condition that $D_v50$ of artificial graphite falls within a proper range, the transmission path of active ions and electrons in the particles may become shorter, and at the same time the interface resistance of the negative electrode may reduce. This allows to readily prepare the negative electrode film having uniformly distributed artificial graphite, so as to improve the dynamic performance of the negative electrode film and reduce polarization. As a result, the fast charging performance and cycle performance of the secondary battery are further improved. In addition, a proper $D_v50$ may allow reduced side reactions of the electrolyte solution, so as to further improve the cycle life of the secondary battery.

In some embodiments, the particle size distribution $D_v10$ of the artificial graphite satisfies 5.2 μm≤$D_v10$≤8.3 μm. Preferably, 6.6 μm≤$D_v10$≤7.8 μm. Under the condition that the artificial graphite comprises a proper amount of smaller particles, the bulk property between the particles of the negative active material may be improved, and the solid phase diffusion performance of the active ions of the negative electrode film may be improved accordingly. As a result, the fast charging performance of the battery is improved. At the same time, the artificial graphite has smaller specific surface area, which could reduce side reactions of electrolyte solution and improve cycle life.

In some embodiments, the particle size distribution $D_v90$ of the artificial graphite satisfies 13 μm≤$D_v$90≤30 μm. Preferably, 15 μm≤$D_v$90≤25 μm. More preferably, 18 μm≤$D_v$90≤22 μm. Under the condition that there is an appropriate amount of large particles in artificial graphite, the transmission rate of active ions and electrons in the negative electrode may be increased. As a result, the fast charging performance of the battery may be further improved.

In some embodiments, the specific surface area SSA of the artificial graphite satisfies 0.6 m$^2$/g≤SSA≤2.5 m$^2$/g. Preferably, 0.9 m$^2$/g≤SSA≤1.7 m$^2$/g. Under the condition that the specific surface area of artificial graphite falls with an appropriate range, the battery meets the electrochemical kinetic performance requirements, and at the same time has reduced side reactions. As a result, the battery may have higher fast charging performance together with cycle life.

In some embodiments, the powder compacted density of the negative active material under a pressure of 2 tons is from 1.5 g/cm$^3$ to 1.7 g/cm$^3$, and preferably from 1.53 g/cm$^3$ to 1.65 g/cm$^3$. Under the condition that the artificial graphite has a suitable powder compacted density, the negative electrode film would have higher compacted density, and at the same time would have a porosity suitable for sufficient infiltration and flow-back of the electrolyte solution. As a result, the battery may have comparative advantages of high energy density, fast charging performance and cycle life.

In some embodiments, the gram capacity of artificial graphite is preferably from 343 mAh/g to 359 mAh/g, and more preferably from 350 mAh/g to 355 mAh/g. Then the artificial graphite has the relatively high gram capacity, while it has the relatively short active ion migration path and also a high structural stability. This is beneficial to maintaining the pore structure inside the negative electrode film so as to facilitate the infiltration and flow-back of electrolyte solution. As a result, the battery may combine high energy density, fast charging performance and cycle life.

In some embodiments, at least a part of the surface of the artificial graphite is covered with a coating layer. Optionally, an area of from 80% to 100% of the surface of the artificial graphite is covered with a coating layer. Further, an area of from 90% to 100% of the surface of the artificial graphite may be covered with a coating layer. Preferably, the coating layer covers 100% of the surface of the artificial graphite.

The coating layer is preferably a conductive coating layer, and more preferably is an amorphous carbon coating layer. The artificial graphite having the surface thereof modified by coating may have higher electronic conductivity, and may result in reduced side reaction of the electrolyte solution on the surface of the material. As a result, the fast charging performance and cycle life of the secondary battery are further improved. Preferably, the coating layer may include one or more of coke, carbon black, soft carbon and hard carbon.

The artificial graphite used in this application are commercially available.

In the secondary battery of the present application, the negative active material may optionally contain other active materials that can be used for the negative electrode of the secondary battery. As an example, other active materials may include, but are not limited to, one or more of natural graphite, hard carbon, soft carbon, silicon-based materials, and tin-based materials. The silicon-based material may be selected from one or more of elemental silicon, silicon-oxygen compounds, silicon-carbon composites, and silicon alloys. The tin-based material may be selected from one or more of elemental tin, tin oxide compounds, and tin alloys.

In the secondary battery of the present application, the negative electrode film may optionally contain a conductive agent. The conductive agent may be selected from conductive materials known in the art that can be used for the negative electrode of a secondary battery. As an example, the conductive agent in the negative electrode film may include one or more of superconducting carbon, acetylene black, conductive carbon black, Ketjen black, carbon dots, carbon nanotubes, graphene, and carbon nanofibers.

In the secondary battery of the present application, the negative electrode film may optionally contain a binder. The binder can be selected from binder materials known in the art that can be used for the negative electrode of a secondary battery. As an example, the binder in the negative electrode film may include one or more of styrene butadiene rubber (SBR), polyvinyl alcohol (PVA), water-based acrylic resin, sodium alginate (SA), and carboxymethyl chitosan (CMCS).

In the secondary battery of the present application, the negative electrode film may optionally contain a thickener. The thickening agent may include carboxymethyl cellulose sodium (CMC-Na), but is not limited thereto.

The inventors have also found that when the negative active material of the secondary battery of the present application includes artificial graphite, and the artificial graphite includes secondary particles, and the battery core meets a specific size design, the performance of the battery may be further improved, provided that the negative electrode film further satisfies one or more of the following conditions of parameters.

In some preferred embodiments, the porosity $P_a$ of the negative electrode film satisfies 23%≤$P_a$≤42%, more preferably 28%≤$P_a$≤37%, and further preferably 30%≤$P_a$≤35%. Under the condition that the porosity of the negative electrode film falls within the given range, the secondary battery may be allowed to better combine good performances of energy density, fast charging performance and cycle life.

In some preferred embodiments, the OI value of the negative electrode film satisfies 10≤OI≤30, more preferably, 14≤OI≤25, and further preferably, 15≤OI≤20. Under the condition that the OI value of the negative electrode film falls within the given range, the particles of the negative active material would have good electrical contact, and the flow volume of the electrolyte solution driven by the volume change during the charging and discharging become small. That is, the "breathing" is weaker. As a result, it would be helpful to maintain good reaction interface, so as to further improve the energy density, fast charging performance and cycle life of the secondary battery.

In some preferred embodiments, the areal density CW of the negative electrode film satisfies 7.1 mg/cm$^2$≤CW≤10.4 mg/cm$^2$. More preferably 7.8 mg/cm$^2$≤CW≤9.1 mg/cm$^2$. Under the condition that the areal density of the negative electrode film falls within the appropriate range, the negative electrode film would have higher energy density, and at the same time have reduced transmission resistance to active ions and electrons. As a result, the energy density, fast charging performance and cycle life of the battery are further improved.

In some preferred embodiments, the compacted density PD of the negative electrode film satisfies 1.4 g/cm³≤PD≤1.7 g/cm³. More preferably, 1.45 g/cm³≤PD≤1.65 g/cm³. Under the condition that the compacted density of the negative electrode film falls within the appropriate range, the negative electrode film has higher energy density, and at the same time has better cycle expansion performance and dynamic performance. As a result, the energy density, fast charging performance and cycle life of the battery are further improved.

In the secondary battery of the present application, the negative current collector may be made of a material with good conductivity and mechanical strength, such as copper foil, but it is not limited thereto.

In the secondary battery of the present application, the cell further comprises a positive plate, the positive plate comprises a positive current collector and a positive electrode film arranged on at least one surface of the positive current collector and comprising a positive active material.

The positive current collector can be made of materials with good electrical conductivity and mechanical strength. In some preferred embodiments, aluminum foil may be used as the positive current collector, but it is not limited thereto.

This application does not limit the specific types of positive active materials, and positive active materials well-known in the art that used in secondary battery positive electrodes can be used, and those skilled in the art can make selections according to actual needs.

In some embodiments, the positive active material may include one or more of lithium cobalt oxide, lithium nickel oxide, lithium manganese oxide, lithium nickel manganese oxide, lithium nickel cobalt manganese oxide, lithium nickel cobalt aluminum oxide, lithium-containing phosphates having olivine structure, and modified materials thereof. The lithium-containing phosphate having olivine structure may include one or more of lithium iron phosphate, a composite material of lithium iron phosphate and carbon, a lithium manganese phosphate, and a composite material of lithium manganese phosphate and carbon. In order to further increase the energy density of the battery, preferably, the positive active material includes one or more of lithium nickel cobalt manganese oxide, lithium nickel cobalt aluminum oxide and the modified compounds thereof. "Modified" may have the meaning that the above-mentioned materials are modified by doping and/or coating of the above-mentioned materials.

In some embodiments, the positive electrode film may optionally comprise a binder. The present application does not specifically limit the types of binders, and those skilled in the art could make selections according to actual requirements. As an example, the binder in the positive electrode film may include one or more of polyvinylidene fluoride (PVDF), polytetrafluoroethylene (PTFE), polyacrylic acid (PAA), polyvinyl alcohol (PVA), sodium alginate (SA), poly methacrylic acid (PMAA) and carboxymethyl chitosan (CMCS).

In some embodiments, the positive electrode film may optionally comprise a conductive agent. The present application does not specifically limit the types of conductive agents, and those skilled in the art can make selections according to actual requirements. As an example, the conductive agent in the positive electrode film may include one or more of graphite, superconducting carbon, acetylene black, carbon black, Ketjen black, carbon dots, carbon nanotubes, graphene, and carbon nanofibers.

It can be understood that the positive current collector has two opposite surfaces in its thickness direction, and the positive electrode film may be laminated on either or both of the opposite surfaces of the positive current collector. The negative current collector has two opposite surfaces in its thickness direction, and the negative electrode film may be laminated on either or both of the opposite surfaces of the negative electrode current collector.

It should be noted that the parameters of each positive and negative electrode film provided in the present application refer to those of a single-sided film. Under the condition that the positive and negative electrode film are arranged on two surfaces of the current collector, the parameters of each film on either surfaces of the current collector meet the conditions as recited in the present application, and thus are considered to fall within the protection scope of the present invention. The ranges of film thickness, compacted density, areal density, OI value, porosity and the like mentioned in the present application all refer to the parameter ranges measured after cold compacted pressing for assembling a secondary battery.

Herein, the number percentage of the secondary particles in the negative active material has a meaning well-known in the art, and can be measured by methods well-known in the art. For example, the negative active material (such as artificial graphite) is laid and glued on the conductive adhesive to make a test sample of length×width=6 cm×1.1 cm; the morphology of the particles in the test sample is tested by means of scanning electron microscope & energy spectrometer (such as ZEISS SEM sigma300). The test may refer to JY/T010-1996. In order to ensure the accuracy of the test results, the test may be conducted as follows: randomly selecting 20 different areas on the tested sample for scanning, and calculating the percentage of the number of secondary particles to the total number of particles in the test area at certain magnification (for example, 1000 times), to obtain the number percentage of secondary particles in this area; taking the average of the test results of 20 test areas as the numeric percentage of the secondary particles in artificial graphite. The agglomerating particles formed via the adhesion of two or more primary particles are the secondary particles.

The gram capacity of the negative active material has a meaning well-known in the art, and may be tested by a method well-known in the art. As an example, the test method may include the following steps: uniformly mixing artificial graphite, conductive agent Super P, binder PVDF and solvent NMP (N-methylpyrrolidone) at a mass ratio of 91.6:1.8:6.6 to obtain a slurry; coating the current collector of copper foil with the slurry, and drying in an oven for later use; using a metal lithium sheet as the counter electrode, and polyethylene (PE) film as the separator, mixing ethylene carbonate (EC), ethyl methyl carbonate (EMC) and diethyl carbonate (DEC) in a volume ratio of 1:1:1, and then dissolving $LiPF_6$ uniformly in the above solution to obtain an electrolyte solution, wherein the concentration of $LiPF_6$ is 1 mol/L; assembling a CR2430 button battery in a glove box protected under argon; keeping the prepared button batter standing for 12 hours, then subjecting it to discharging to 0.005V at a constant current of 0.05C; standing for 10 minutes and then discharging to 0.005V at a constant current of 50 μA, then standing for 10 minutes and then discharging to 0.005V at a constant current of 10 μA, and then charging to 2V at a constant current of 0.1C; and recording the charging capacity. The ratio of the charging capacity to the mass of the artificial graphite is the gram capacity of the artificial graphite.

$D_v99$, $D_v90$, $D_v50$, and $D_v10$ of the negative active material have meanings well-known in the art, and can be tested by methods well-known in the art. For example, the test may be readily conducted on a laser particle size analyzer (such as Malvern Master Size 3000) according to standard GB/T 19077-2016 "Particle size analysis—Laser diffraction methods". $D_v90$ has the physical meaning that the particle size at which the cumulative volume distribution percentage of the material reaches 90%; $D_v50$ has the physical meaning that the particle size at which the cumulative volume distribution percentage of the material reaches 50%; and $D_v10$ has the physical meaning that the particle size at which the cumulative volume distribution percentage of the material reaches 10%.

The specific surface area SSA of the negative active material has a meaning well-known in the art, and can be tested by methods well-known in the art. For example, test may be conducted according to GB/T 19587-2017, conducting the test according to analysis method of specific surface area by nitrogen adsorption, and calculating according to BET (Brunauer Emmett Teller) method, wherein analysis method of specific surface area by nitrogen adsorption may be conducted on the Specific Surface Area and Pore Size Analyser of Tri-Star 3020 type available from Micromeritics company, USA.

The powder compacted density of the negative active material has a meaning well-known in the art, and can be tested by a method well-known in the art. For example, the test may be conducted on an Electronic Pressure Tester (such as UTM7305) according to GB/T 24533-2009 as follows: putting a certain amount of powder on a special compacted mold; setting different pressures, and reading the thickness of the powder under different pressures on the device; and the compacted densities under different pressures are obtained by calculating.

It should be noted that the above-mentioned various parameter tests for the negative active material are conducted on samples taken from a cold-pressed negative electrode film. As an example of taking sample of negative electrode active material from a cold-pressed negative electrode film, the cold-pressed negative electrode film may be placed in deionized water, the negative active material will naturally fall off. The negative active material is subjected to suction filtration and drying, and then the dried negative active material is sintered in air at 400° C. for 2 hours to remove the binder and conductive carbon, so as to obtain the negative active material.

The areal density of the negative electrode film has a meaning well-known in the art, and may be tested using instruments and methods well-known in the art. For example, taking a negative electrode plate that is cold-pressed and coated on single side (in the case of coated on two sides, the negative electrode film on one side may be wiped off); punching it into a small round having an area of $S_1$; weighing it, and recording the weight as $M_1$; then wiping off the negative electrode films of the above weighted negative electrode plate; weighting the negative current collector, recording the weight as $M_0$. Areal density of the negative electrode film=(weight of the negative electrode film $M_1$−weight of the negative current collector $M_0$)/$S_1$.

The thickness of the negative electrode film has a meaning well-known in the art, and can be tested using instruments and methods well-known in the art. For example, the test may be conducted on a Spiral Micrometer having 4-digit precision.

The compacted density of the negative electrode film has a meaning well-known in the art, and can be tested using instruments and methods well-known in the art. The compacted density of the negative electrode film=the areal density of the negative electrode film/the thickness of the negative electrode film.

The porosity of the negative electrode film has a meaning well-known in the art, and can be tested using instruments and methods known in the art. Exemplary test methods are as follows: cutting a small round sample having a diameter of 14 mm from a negative electrode plate covered with a negative electrode film on one side; measuring the thickness of the negative electrode film (thickness of the negative electrode plate–thickness of the negative current collector); calculating the apparent volume of the negative electrode film $V_{apparent}$ according to the calculating formula of cylinder; measuring the true volume of negative electrode plate on True Density Tester (such as Micromeritics AccuPyc II 1340) by gas displacement method using inert gas such as helium or nitrogen as the medium, testing may refer to GB/T 24586-2009; the true volume of the negative electrode film $V_{true}$ is obtained by subtracting the true volume of the negative electrode plate with the volume of the negative current collector; the porosity of the negative electrode film=$(V_{apparent}-V_{true})/V_{apparent} \times 100\%$. Testing may be conducted on multiple (such as 30) samples of plate, and the results are average value, so as to improve the accuracy of the test results.

The OI value of the negative electrode plate has a meaning well-known in the art, and can be tested using instruments and methods well-known in the art. For example, X-ray diffraction spectrum can be obtained on X-ray Powder Diffractometer (such as PANalytical X'pert PRO type) according to JIS K 0131-1996 "General Rules of X-ray Diffraction Analysis" and JB/T4220-201 "Method for Testing Lattice Parameters of Graphite"; OI value of the negative electrode film=C004/C110, where C004 is the peak area of characteristic diffraction peak 004 of the negative electrode plate in the X-ray diffraction spectrum, and C110 is the peak area of characteristic diffraction peak 110 of the negative electrode plate in the X-ray diffraction spectrum.

In the X-ray diffraction analysis test, a copper target may be used as the anode target, CuKα rays are used as the radiation source, the ray wavelength λ=1.5418 Å, the scanning 2θ angle range is from 20° to 80°, and the scanning rate is 4°/min. The 2θ angle corresponding to the 004 crystal plane of graphite is from 53.5° to 55.5°; and the 2θ angle corresponding to the 110 crystal plane of graphite is from 76.5° to 78.5°.

In the secondary battery of the present application, the cell further includes a separator. The separator, being arranged between the positive plate and the negative electrode plate, has the effect of isolation. There is no particular limitation to the type of separator in this application, and any well-known porous separator having good chemical stability and mechanical stability can be selected. For example, the separator may include glass fiber film, non-woven fabric film, polyethylene film, polypropylene film, polyvinylidene fluoride film and the multilayer composite film thereof.

The secondary battery of the present application may further include electrolyte solution. The electrolyte solution includes an organic solvent and an electrolyte salt dispersed in the organic solvent. The types of organic solvents and electrolyte salts and the composition of the electrolyte are specifically limited, and can be selected according to requirements.

As examples, the organic solvent may include one or more selected from ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS) and diethyl sulfone (ESE).

As examples, the electrolyte salt may include one or more selected from $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bis(trifluoromethane sulfonimide)), LiTFS (lithium trifluoromethane sulfonate), LiDFOB (lithium difluorooxalate borate), LiBOB (lithium dioxalate borate), $LiPO_2F_2$ (lithium difluorophosphate), LiDFOP (lithium difluorodioxalate phosphate) and LiTFOP (lithium tetrafluorooxalate phosphate).

In some embodiments, the electrolyte solution may optionally include additives. The types of additives are specifically limited, and can be selected according to requirements. For example, the additives may include negative electrode film-forming additives, and may include positive electrode film-forming additives, and yet may include additives that can improve certain performances of battery, for example, additives that improve battery overcharge performance, additives that improve high temperature performance of battery, and additives that improve low-temperature performance of battery.

The secondary battery may include an outer package, which is used to encapsulate the electrode assembly and electrolyte solution. The types of outer package of the secondary battery are specifically limited, and can be selected according to actual requirements. In some embodiments, the outer package of the secondary battery may be a soft bag, such as a pouch-type soft bag. The material of the soft bag may be plastic, for example, may include one or more of polypropylene (PP), polybutylene terephthalate (PBT), polybutylene succinate (PBS), and the like. The outer package of the secondary battery may also be a hard housing, such as a hard plastic housing, an aluminum housing, a steel housing, or the like.

The secondary battery may be prepared by a method well-known in the art. For example, the secondary battery may be prepared by the following method: dispersing the negative active material and optional conductive agent, binder and thickener in a solvent (such as water), to form a uniform negative electrode slurry; coating the negative electrode slurry on the negative current collector, after processes of drying, cold pressing etc., to obtain a negative electrode plate; conducting a process of punching or laser die cutting etc. on the uncoated area of the negative current collector, to obtain the negative electrode tab; dispersing the positive active material and optional conductive agent and binder in a solvent (such as N-methylpyrrolidone, referred as NMP for short), to form a uniform positive electrode slurry; coating the positive electrode slurry on the positive current collector, after processes of drying, cold pressing etc., to obtain a positive electrode plate; conducting a process of punching or laser die cutting etc. on the uncoated area of the positive current collector, to obtain the positive electrode tab; forming an electrode assembly by winding or laminating the positive plate, the separator and the negative electrode plate, wherein the separator, located between the positive plate and the negative electrode plate, has a function of isolation; placing the electrode assembly in the outer package, injecting the electrolyte solution and sealing; conducting processes such as formation, to obtain secondary battery.

Figure 6:
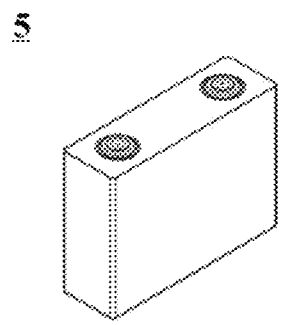
FIG. 6 is a schematic diagram of a secondary battery according to one embodiment.

The shape of the secondary battery is not specifically limited in the present application, and it may be cylindrical, square or other arbitrary shapes. FIG. 6 shows an exemplary secondary battery 5 having a square structure.

Figure 7:
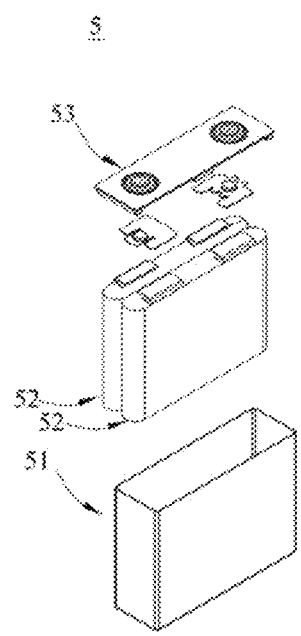
FIG. 7 is an exploded view of FIG. 6.

Referring to FIGS. 6 and 7, the outer package may include a housing 51 and a cover 53, wherein the housing 51 may include a bottom plate and a side plate connected to the bottom plate, and the bottom plate and the side plate are enclosed to form a receiving cavity. Housing 51 has an opening communicating with the receiving cavity; and cover 53 may cover the opening to close the receiving cavity. The electrode assembly 52 is encapsulated in the receiving cavity. The electrolyte solution has a function of infiltration in the cell. The number of electrode assemblies 52 included in the secondary battery 5 may be one or several, which may be adjusted according to requirements.

In some embodiments, the secondary battery may be assembled into a battery module, the number of secondary batteries contained in the battery module may be multiple, and the specific number nay be adjusted according to the application and capacity of the battery module.

Figure 8:
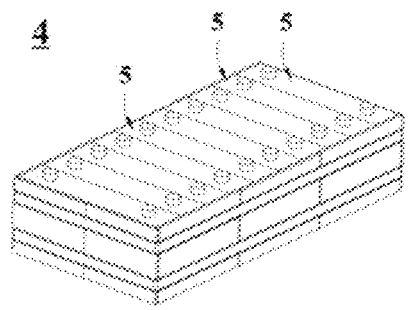
FIG. 8 is a schematic diagram of a battery module according to one embodiment.

FIG. 8 is an exemplary battery module 4. Referring to FIG. 8, in the battery module 4, multiple secondary batteries 5 may be arranged in sequence along the length direction of the battery module 4. Of course, they can also be arranged in other arbitrary manners. Furthermore, the multiple secondary batteries 5 may be fixed via fasteners.

Optionally, battery module 4 may further include a housing having a receiving space, and multiple secondary batteries 5 are received in the receiving space.

In some embodiments, the above-mentioned battery modules may also be assembled into a battery pack, and the number of battery modules included in the battery pack may be adjusted according to the application and capacity of the battery pack.

Figure 9:
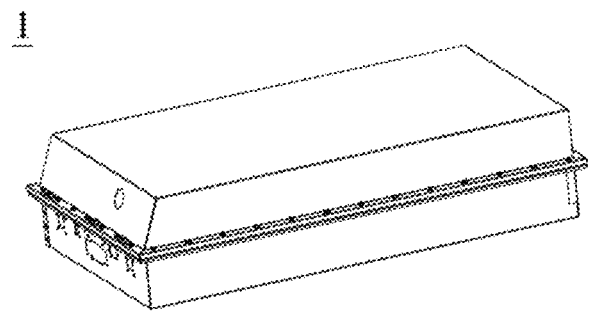
FIG. 9 is a schematic diagram of a battery pack according to one embodiment.
Figure 10:
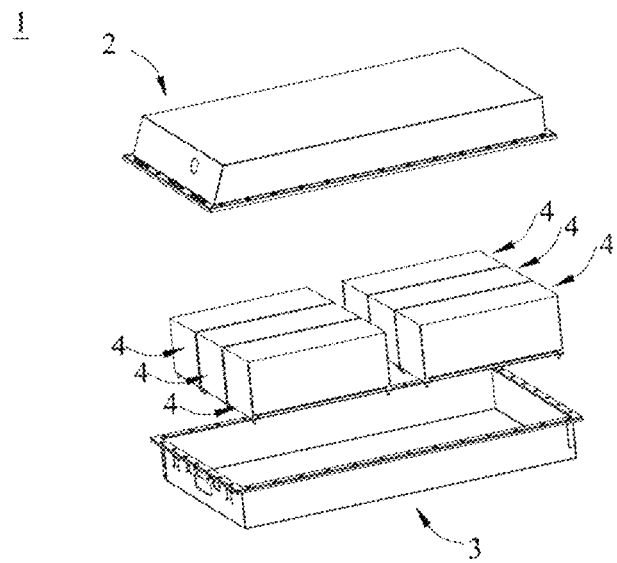
FIG. 10 is an exploded view of FIG. 9.

FIGS. 9 and 10 show an exemplary battery pack 1. Referring to FIGS. 9 and 10, the battery pack 1 may include a battery case and multiple battery modules 4 arranged in the battery case. The battery case includes an upper case body 2 and a lower case body 3. The upper case body 2 may cover the lower case body 3 to form a closed space for receiving the battery module 4. The multiple battery modules 4 may be arranged in the battery case in arbitrary manners.

Apparatus

A second aspect of the present application provides an apparatus comprising the secondary battery of the first aspect of the present application. The secondary battery may be used as a power source of the apparatus, or may be used as an energy storage unit of the apparatus. The apparatus may be, but is not limited to, mobile devices (such as mobile phones, laptops), electric vehicles (such as pure electric vehicles, hybrid electric vehicles, plug-in hybrid electric vehicles, electric bicycles, electric scooters, electric golf carts, electric trucks), electric trains, ships and satellites, energy storage systems, etc.

The apparatus, according to the application requirements, may include a secondary battery, a battery module, or a battery pack.

Figure 11:
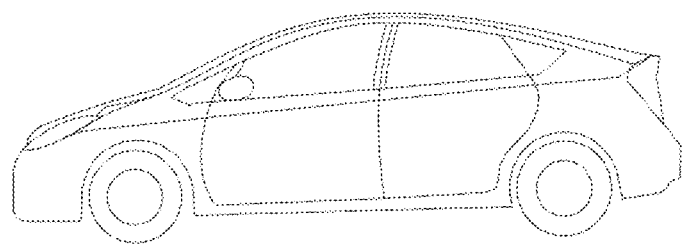
FIG. 11 is a schematic diagram of an apparatus wherein the secondary battery is used as a power source according to one embodiment.

FIG. 11 is an exemplary apparatus. The apparatus is a pure electric vehicle, a hybrid electric vehicle, or a plug-in hybrid electric vehicle, etc. In order to meet the requirements of the apparatus for high power and high energy density of the secondary battery, a battery pack or a battery module may be used.

As another example, the apparatus may be a mobile phone, a tablet computer, a laptop, and the like. The apparatus is generally required to be thin and light, and thus a secondary battery may be used as a power source.

Exemplary Embodiments

Embodiment 1. A secondary battery, comprising an electrode assembly which comprises
a cell and tabs extending from the cell, the cell comprising
a negative electrode plate, the negative electrode plate comprising a negative current collector and a negative electrode film arranged on at least one surfaces of the negative current collector and comprising a negative active material,
wherein the negative active material comprises artificial graphite comprising secondary particles; and
the cell satisfies 5 cm$\leq 0.5 \times \sqrt{a^2+b^2} \leq$15 cm, and a$\leq$15 cm, where a is the maximum size of the cell in the direction in which the tabs extend, in cm; and b is the maximum size of the cell in a direction perpendicularly intersecting with the direction in which the tabs extend, in cm.

Embodiment 2. The secondary battery according to embodiment 1, wherein number percentage S of the secondary particles in the artificial graphite satisfies S$\geq$30%, and preferably 50%$\leq$S$\leq$80%.

Embodiment 3. The secondary battery according to any one of embodiments 1 to 2, wherein the cell satisfies 7 cm$\leq 0.5 \times \sqrt{a^2+b^2} \leq$15 cm, and Preferably 9 cm$\leq 0.5 \times \sqrt{a^2+b^2} \leq$13 cm.

Embodiment 4. The secondary battery according to any of embodiments 1 to 3, wherein 6 cm$\leq$a$\leq$13 cm, and preferably 7 cm$\leq$a$\leq$12 cm.

Embodiment 5. The secondary battery according to any one of embodiments 1 to 4, wherein the artificial graphite further satisfies one or more of the following conditions (1) to (6):
(1) the artificial graphite has a particle size distribution $D_v10$ satisfying 5.2 μm$\leq D_v10\leq$8.3 μm, and preferably 6.6 μm$\leq D_v10\leq$7.8 μm;
(2) the artificial graphite has an average particle size $D_v50$ satisfying 6 μm$\leq D_v50\leq$15 μm, and preferably 8 μm$\leq D_v50\leq$13 μm;
(3) the artificial graphite has a particle size distribution $D_v90$ satisfying 13 μm$\leq D_v90\leq$30 μm, and preferably 15 μm$\leq D_v90\leq$25 μm;
(4) the artificial graphite has a specific surface area SSA satisfying 0.6 m$^2$/g$\leq$SSA$\leq$2.5 m$^2$/g, and preferably 0.9 m$^2$/g$\leq$SSA$\leq$1.7 m$^2$/g;
(5) the artificial graphite has a powder compacted density under a pressure of 2 tons of from 1.5 g/cm$^3$ to 1.7 g/cm$^3$, and preferably from 1.53 g/cm$^3$ to 1.65 g/cm$^3$; and
(6) at least part of the surface of the artificial graphite is coated with a coating layer.

Embodiment 6. The secondary battery according to any of embodiments 1 to 5, wherein the artificial graphite has a gram capacity of from 343 mAh/g to 359 mAh/g, and preferably from 350 mAh/g to 355 mAh/g.

Embodiment 7. The secondary battery according to any of embodiments 1 to 6, wherein the negative electrode film satisfies one or more of the following conditions (1) to (4):
(1) the negative electrode film has an areal density CW satisfying 7.1 mg/cm$^2\leq$CW$\leq$10.4 mg/cm$^2$, and preferably 7.8 mg/cm$^2\leq$CW$\leq$9.1 mg/cm$^2$;
(2) the negative electrode film has a compacted density PD satisfying 1.4 g/cm$^3\leq$PD$\leq$1.7 g/cm$^3$, and preferably 1.45 g/cm$^3\leq$PD$\leq$1.65 g/cm$^3$;
(3) the negative electrode film has a porosity $P_a$ satisfying: 23%$\leq P_a\leq$42%, and preferably 28%$\leq P_a\leq$37%; and
(4) the negative electrode film has a OI value satisfying: 10$\leq$OI$\leq$30, and preferably, 14$\leq$OI$\leq$25.

Embodiment 8. The secondary battery according to any of embodiments 1 to 7, wherein the cell further satisfies 0.3$\leq$a/b$\leq$0.8, and preferably 0.4$\leq$a/b$\leq$0.6.

Embodiment 9. The secondary battery according to any of embodiments 1 to 8, wherein the battery cell comprises a positive plate, the positive plate comprises a positive current collector and a positive electrode film arranged on at least one surfaces of the positive current collector and comprising positive active material, wherein the positive active material comprises one or more selected from the group of lithium nickel cobalt manganese oxide, lithium nickel cobalt aluminum oxide and the modified compounds thereof.

Embodiment 10. An apparatus comprising the secondary battery according to any of embodiments 1 to 9.

EXAMPLES

The following examples illustrate the contents disclosed in the present application more concretely, but these examples are only for explanatory description, since various modifications and changes within the scope of the present disclosure are apparent to those skilled in the art. Unless otherwise stated, all the parts, percentages and ratios reported in the following examples are based on weight; all the reagents used in the examples are commercially available or synthesized according to conventional methods, and these reagents can be used directly, without further processing; and the instruments used in the examples are all commercially available.

Example 1 (Ex. 1)

1) Preparation of Positive Plate

The lithium nickel cobalt manganese oxide LiNi$_{0.6}$Co$_{0.2}$Mn$_{0.2}$O$_2$ (NCM622) as the positive active material, carbon nanotubes (CNT) and conductive carbon black (Super P) as the conductive agent, and PVDF as the binder were mixed at mass ratio of 97.5:0.5:0.9:1.1 in an appropriate amount of NMP under fully stirring, to form a uniform positive electrode slurry; the positive electrode slurry was coated on an aluminum foil as the positive current collector, and then the positive current collector coated with the positive electrode slurry was transferred into an oven for drying, after processes of cold pressing and cutting etc., the positive plate was obtained; and the positive electrode tab was obtained by punching the uncoated area of the positive current collector. The compacted density of the positive electrode film was 3.4 g/cm$^3$, and the areal density was 14.1 mg/cm$^2$.

2) Preparation of Negative Electrode Plate

The artificial graphite as the negative active material, Super P as the conductive agent, sodium carboxymethyl cellulose (CMC-Na) as the thickener, and styrene butadiene rubber (SBR) as the binder were mixed at a mass ratio of 94.5:1.5:1.5:2.5, and deionized water was added as the solvent, the system was subjected to stirring on a vacuum mixer until become uniform, to obtain the negative electrode slurry; the negative electrode slurry was evenly coated on copper foil as the negative current collector; and then the negative current collector coated with the negative electrode slurry, after drying at room temperature, was transferred into an oven for continuing drying, after processes of cold pressing and cutting etc., the negative electrode plate was obtained; and the negative electrode tab was obtained by punching the uncoated area of the negative current collector. The compacted density of the negative electrode film was 1.50 g/cm$^3$, and the area density was 8.44 mg/cm$^2$.

3) Separator

A polyethylene film is used as the separator.

4) Preparation of Electrolyte Solution

Ethylene carbonate (EC), dimethyl carbonate (DMC), and diethyl carbonate (DEC) were mixed at a volume ratio of 1:1:1, and fully dried lithium salt LiPF$_6$ was dissolved in the mixed organic solvent, to formulate an electrolyte solution having a concentration of 1 mol/L.

5) Preparation of Secondary Battery

The above positive plate, separator, and negative electrode plate were stacked in order, with a reference electrode added between the separator and the negative electrode plate (the reference electrode was used for the subsequent performance testing of battery samples and could be selected as lithium sheet and lithium metal wire etc.; in addition, the reference electrode should be separated by a separator to prevent contact with either side of the positive and negative electrodes). The electrode assembly was obtained after winding, wherein the width of the winding corresponded to the cell size b. The above-mentioned electrode assembly was packed in an outer package, and the positive electrode tab and the negative electrode tab were electrically connected to the corresponding electrode terminals (arranged on the top cover of the battery outer package) via the adapter sheet respectively. The electrolyte solution prepared above was added and sealed to obtain a secondary battery.

Examples 2-19 (Ex. 2-19) and Comparative Examples 1-5 (CE. 1-5)

The preparation was the same as Example 1, except that the relevant parameters for preparing the negative electrode plate were adjusted according to the details listed in Table 1.

In Table 1, NCM622 having a gram capacity of 185 mAh/g was used as the positive active material in Examples 1-16 and Comparative Examples 1-5; LiNi$_{0.5}$Co$_{0.2}$Mn$_{0.3}$O$_2$ (NCM523) having a gram capacity of 175 mAh/g was used as the positive active material in Example 17; LiNi$_{0.8}$Co$_{0.1}$Mn$_{0.1}$O$_2$ (NCM811) having a gram capacity of 200 mAh/g was used as the positive active material in Example 18; and lithium iron phosphate (LFP) having a gram capacity of 144 mAh/g was used as the positive active material of Example 19.

The areal density and compacted density of the positive electrode films of Examples 1-16 and Comparative Examples 1-5 were identical to those of Example 1; the compacted density of the positive electrode film of Example 17 was 3.45 g/cm$^3$, and the areal density was 14.9 mg/cm$^2$; the compact density of the positive electrode film of Example 18 was 3.5 g/cm$^3$, and the areal density was 13.1 mg/cm$^2$; the compacted density of the positive electrode film of Example 19 was 2.35 g/cm$^3$ and the areal density was 18.2 mg/cm$^2$. The compacted density and areal density of the negative electrode film of Example 2 were identical to those of Example 1; and the compacted density of the negative electrode films of Examples 3-19 and Comparative Examples 1-5 were 1.5 g/cm$^3$, and the areal density were 8.39 mg/cm$^2$.

Test (1) Test for Cycle Performance

At 25° C., the secondary batteries prepared in the above examples and comparative examples were charged to the charge cut-off voltage $V_1$ with constant current at a rate of 1C, then charged to the current of ≤0.05 C at a constant voltage, after standing for 5 minutes, and they were discharged to the discharge cut-off voltage $V_2$ with constant current at a rate of 0.33 C, and were allowed to stand for 5 minutes, this is one charging-discharging cycle. According to this method, the batteries were subjected to a cyclic charging and discharging test until the battery capacity decays to 80%. Then the numbers of cycles was the cycle life of the battery at 25° C.

(2) Test for Fast Charging Performance

At 25° C., the secondary batteries prepared in the above examples and comparative examples were charged and discharged for the first time at a current of 1C (that is, the current under theoretical capacity was completely discharged within 1 h) as follows: the batteries were charged to the charge cut-off voltage $V_1$ at a constant current rate of 1C, then were charged to a current of ≤0.05C at a constant voltage, after standing for 5 minutes, they were discharged to the discharge cut-off voltage $V_2$ at a constant current rate of 0.33C, recorded as actual capacity $C_0$.

Then the batteries were charged to the full battery charge cut-off voltage $V_1$ or negative cut-off potential of 0V (whichever is reached first) at constant current of 2.8C0, 3C0, 3.2C0, 3.5C0, 3.8C0, 4.1C0, 4.4C0, 4.7C0, 5C0, 5.3C0, 5.6C0, and 5.9C0, and after the completion of each charging, it was needed to discharge to the full battery discharge cut-off voltage $V_2$ at 1C0; the values of negative potential corresponding to 10%, 20%, 30%, . . . , 80% of SOC (State of Charge, state of charge) at different charging rates were recorded, then the curve of charging rate-negative potential at different SOC states was plotted; after linear fitting, there was obtained the charging rates corresponding to different SOC states when the negative electrode potential was 0V. The charging rates are the charging window at SOC state, recorded as $C_{20\%\ SOC}$, $C3_{0\%\ SOC}$, $C_{40\%\ SOC}$, $C_{50\%\ SOC}$, $C_{60\%\ SOC}$, $C_{70\%\ SOC}$, and $C_{80\%\ SOC}$ respectively. According to formula $(60/C_{20\%\ SOC}+60/C_{30\%\ SOC}+60/C_{40\%\ SOC}+60/C_{50\%\ SOC}+60/C_{60\%\ SOC}+60/C_{70\%\ SO}C+60/C_{80\%\ SOC})\times10\%$, the charging time T for which the batteries were charged from 10% SOC to 80% SOC was calculated, in min. The shorter the time was, the better the fast charging performance of the battery was.

(3) Test for High-Temperature Storage Performance

At 25° C., the secondary batteries prepared in the above examples and comparative examples were charged to the charge cut-off voltage $V_1$ at a rate of 1C, then charged to a current of 0.05C at a constant voltage; after standing for 5 minutes, they were discharged to the discharge cut-off voltage $V_2$ with a constant current at a rate of 0.33 C, and the initial capacity of the batteries were obtained. Then, at 25° C., the batteries were charged to the charge cut-off voltage $V_1$ at a rate of 1C, and then charged to a current of 0.05C at a constant voltage. At this time, the batteries were fully charged. The fully charged batteries were stored in incubator at 60° C. Every 7 days, the batteries were taken out to be subjected to discharging to discharge cut-off voltage $V_2$ at a rate of 0.33C at 25° C., after standing for 5 minutes, then to charging to charge cut-off voltage $V_1$ at 1C, and then to charging to a current of 0.05C at constant voltage, and after standing for 5 min, then to discharging at a constant current rate of 0.33 C, the battery capacity at this time were tested. When the capacity decays to 80% of the initial capacity, the number of days of storing was recorded. (It should be noted that the batteries, after being taken out to test the capacity each time, should be charged to the charge cut-off voltage $V_1$ at a rate of 1C, then charged to a current of 0.05C at a constant voltage, so as to keep the battery at a fully charged state, and then they were placed in incubator at 60° C. for storing.)

The charging-discharging cut-off voltage intervals may be the nominal voltage intervals of the battery. In the above test,
the charging-discharging cut-off voltage interval $V_1$-$V_2$ of the battery using NCM622 positive material was from 2.8V to 4.35V;
the charging-discharging cut-off voltage interval $V_1$~$V_2$ of the battery using NCM523 positive material was from 2.8V to 4.25V;
the charging-discharging cut-off voltage interval $V_1$-$V_2$ of the battery using NCM811 positive material was from 2.8V to 4.2V; and
the charging-discharging cut-off voltage interval $V_1$-$V_2$ of the battery using LFP positive material was from 2.5V to 3.65V.

The above recitation are only detailed description of the present application, nevertheless, the scope of protection according to the present application is not limited thereto. Any person skilled in the art who is familiar with the present technical field, within the technical contents as discloses in the present application, can easily think of various equivalent modifications or alternations, which would be covered within the scope of protection according to the present application. Therefore, the protection scope according to the present application should be subject to the protection scope as defined in the claims.

What is claimed is:

1. A secondary battery, comprising an electrode assembly which comprises a cell and tabs extending from the cell, the cell comprising a negative electrode plate, the negative electrode plate comprising a negative current collector and a negative electrode film arranged on at least one surfaces of the negative current collector and comprising a negative active material,
wherein the negative active material comprises artificial graphite comprising secondary particles;

TABLE 1

| | Artificial graphite | | | | | Negative electrode film | | Cell | | | | Secondary batteries | | |
|---|---|---|---|---|---|---|---|---|---|---|---|---|---|---|
| | Type of positive active materials | Number percentage of secondary particles | $D_v50$ µm | $D_v10$ µm | $D_v90$ µm | Gram capacity mAh/g | porosity % | OI values | Size a cm | Size b cm | R | a/b | Fast charging performance min | Numbers of cycle | High-temperature storage performance/ day |
| Ex. 1 | NCM622 | 20% | 10.4 | 6.8 | 16.1 | 353.2 | 31.8 | 18.8 | 10.2 | 22.0 | 12.1 | 0.46 | 9.6 | 2127 | 483 |
| Ex. 2 | NCM622 | 30% | 10.8 | 6.9 | 16.2 | 353.5 | 31.8 | 18.6 | 10.2 | 22.0 | 12.1 | 0.46 | 9.4 | 2242 | 476 |
| Ex. 3 | NCM622 | 40% | 11.3 | 6.7 | 18.4 | 353.8 | 31.8 | 18.3 | 10.2 | 22.0 | 12.1 | 0.46 | 9.3 | 2539 | 468 |
| Ex. 4 | NCM622 | 50% | 12.0 | 6.6 | 20.9 | 354.7 | 31.8 | 17.7 | 10.2 | 22.0 | 12.1 | 0.46 | 9.2 | 2592 | 455 |
| Ex. 5 | NCM622 | 75% | 12.2 | 7.2 | 19.8 | 354.8 | 31.8 | 17.2 | 10.2 | 22.0 | 12.1 | 0.46 | 9.2 | 3019 | 441 |
| Ex. 6 | NCM622 | 100% | 12.3 | 7.8 | 18.7 | 355.1 | 31.8 | 16.7 | 10.2 | 22.0 | 12.1 | 0.46 | 8.9 | 3053 | 415 |
| Ex. 7 | NCM622 | 50% | 12.0 | 6.6 | 20.9 | 354.7 | 31.8 | 17.7 | 6.9 | 22.0 | 11.5 | 0.31 | 9.8 | 3074 | 469 |
| Ex. 8 | NCM622 | 50% | 12.0 | 6.6 | 20.9 | 354.7 | 31.8 | 17.7 | 8.2 | 22.0 | 11.7 | 0.37 | 9.6 | 2848 | 463 |
| Ex. 9 | NCM622 | 50% | 12.0 | 6.6 | 20.9 | 354.7 | 31.8 | 17.7 | 9.8 | 22.0 | 12.0 | 0.44 | 9.4 | 2735 | 459 |
| Ex. 10 | NCM622 | 50% | 12.0 | 6.6 | 20.9 | 354.7 | 31.8 | 17.7 | 11.0 | 22.0 | 12.3 | 0.50 | 9.1 | 2319 | 452 |
| Ex. 11 | NCM622 | 50% | 12.0 | 6.6 | 20.9 | 354.7 | 31.8 | 17.7 | 11.9 | 22.0 | 12.5 | 0.54 | 8.9 | 2275 | 449 |
| Ex. 12 | NCM622 | 50% | 12.0 | 6.6 | 20.9 | 354.7 | 31.8 | 17.7 | 12.9 | 22.0 | 12.8 | 0.59 | 8.9 | 2037 | 446 |
| Ex. 13 | NCM622 | 50% | 12.0 | 6.6 | 20.9 | 354.7 | 31.8 | 17.7 | 10.2 | 24.4 | 13.2 | 0.42 | 9.0 | 2218 | 432 |
| Ex. 14 | NCM622 | 50% | 12.0 | 6.6 | 20.9 | 354.7 | 31.8 | 17.7 | 10.2 | 26.8 | 14.3 | 0.38 | 8.9 | 2107 | 417 |
| Ex. 15 | NCM622 | 50% | 12.0 | 6.6 | 20.9 | 354.7 | 31.8 | 17.7 | 10.2 | 18.4 | 10.5 | 0.55 | 9.5 | 2689 | 468 |
| Ex. 16 | NCM622 | 50% | 12.0 | 6.6 | 20.9 | 354.7 | 31.8 | 17.7 | 10.2 | 14.8 | 9.0 | 0.69 | 9.8 | 2898 | 475 |
| Ex. 17 | NCM523 | 50% | 12.0 | 6.6 | 20.9 | 354.7 | 31.8 | 17.7 | 10.2 | 22.0 | 12.1 | 0.45 | 9.1 | 2832 | 467 |
| Ex. 18 | NCM811 | 50% | 12.0 | 6.6 | 20.9 | 354.7 | 31.8 | 17.7 | 10.2 | 22.0 | 12.1 | 0.45 | 9.5 | 2156 | 402 |
| Ex. 19 | LFP | 50% | 12.0 | 6.6 | 20.9 | 354.7 | 31.8 | 17.7 | 10.2 | 22.0 | 12.1 | 0.45 | 8.8 | 3652 | 433 |
| CE. 1 | NCM622 | 0% | 10.3 | 5.6 | 17.0 | 354.6 | 31.8 | 19.3 | 10.2 | 22.0 | 12.1 | 0.45 | 12.1 | 1538 | 427 |
| CE. 2 | NCM622 | 50% | 12.0 | 6.6 | 20.9 | 354.7 | 31.8 | 17.7 | 20.2 | 17.4 | 13.3 | 1.16 | 9.1 | 1425 | 397 |
| CE. 3 | NCM622 | 50% | 12.0 | 6.6 | 20.9 | 354.7 | 31.8 | 17.7 | 11.9 | 29.3 | 15.8 | 0.41 | 9.0 | 1502 | 385 |
| CE. 4 | NCM622 | 100% | 12.3 | 7.8 | 18.7 | 355.1 | 31.8 | 16.7 | 20.2 | 17.4 | 13.3 | 1.16 | 9.0 | 1436 | 365 |
| CE. 5 | NCM622 | 100% | 12.3 | 7.8 | 18.7 | 355.1 | 31.8 | 16.7 | 11.9 | 29.3 | 15.8 | 0.41 | 8.9 | 1518 | 358 |

From the results of Examples 1-17, it can be seen that the negative active material of the secondary battery provided in the present application comprised the artificial graphite including secondary particles, and the cells met the specific size design. As a result, the secondary batteries had higher energy density, and at the same time had better fast charging performance, cycle life and high-temperature storage performance.

From the results of Comparative Examples 1 to 5, it can be seen that when the secondary batteries did not meet all the conditions of the technical solutions according to the present application, the secondary batteries could not have good fast charging performance, cycle life, and high-temperature storage performance at the same time.

the cell satisfies 9 cm$\leq 0.5\times\sqrt{a^2+b^2}\leq$15 cm, and a $\leq$15 cm, where a is the maximum size of the cell in the direction in which the tabs extend, in cm; and b is the maximum size of the cell in a direction perpendicularly intersecting with the direction in which the tabs extend, in cm; and
the cell further satisfies 0.3$\leq$a/b$\leq$0.8.

2. The secondary battery according to claim 1, wherein number percentage S of the secondary particles in the artificial graphite satisfies S$\geq$30%.

3. The secondary battery according to claim 1, wherein the cell satisfies 9 cm$\leq 0.5\times\sqrt{a^2+b^2}\leq$13 cm.

4. The secondary battery according to claim 1, wherein 6 cm$\leq$a$\leq$13 cm.

5. The secondary battery according to claim 1, wherein the artificial graphite has a particle size distribution $D_v10$ satisfying 5.2 µm≤$D_v10$≤8.3 µm.

6. The secondary battery according to claim 1, wherein the artificial graphite has an average particle size $D_v50$ satisfying 6 µm≤$D_v50$≤15 µm.

7. The secondary battery according to claim 1, wherein the artificial graphite has a particle size distribution $D_v90$ satisfying 13 µm≤$D_v90$≤30 µm.

8. The secondary battery according to claim 1, wherein the artificial graphite has a specific surface area SSA satisfying 0.6 m$^2$/g≤SSA≤2.5 m$^2$/g.

9. The secondary battery according to claim 1, wherein the artificial graphite has a powder compacted density under a pressure of 2 tons of 1.5 g/cm$^3$ to 1.7 g/cm$^3$.

10. The secondary battery according to claim 1, wherein at least part of the surface of the artificial graphite is coated with a coating layer.

11. The secondary battery according to claim 1, wherein the artificial graphite has a gram capacity of 343 mAh/g to 359 mAh/g.

12. The secondary battery according to claim 1, wherein the negative electrode film has an areal density CW satisfying 7.1 mg/cm$^2$≤CW≤10.4 mg/cm$^2$.

13. The secondary battery according to claim 1, wherein the negative electrode film has a compacted density PD satisfying 1.4 g/cm$^3$≤PD≤1.7 g/cm$^3$.

14. The secondary battery according to claim 1, wherein the negative electrode film has a porosity $P_a$ satisfying: 23%≤$P_a$≤42%.

15. The secondary battery according to claim 1, wherein the negative electrode film has a OI value satisfying: 10≤OI≤30.

16. The secondary battery according to claim 1, wherein the cell further satisfies 0.4≤a/b≤0.6.

17. The secondary battery according to claim 1, wherein the battery cell comprises a positive plate, the positive plate comprises a positive current collector and a positive electrode film arranged on at least one surfaces of the positive current collector and comprising positive active material, wherein the positive active material comprises one or more selected from the group consisting of lithium nickel cobalt manganese oxide, lithium nickel cobalt aluminum oxide and the modified compounds thereof.

18. An apparatus comprising the secondary battery according to claim 1.

19. The secondary battery according to claim 1, wherein 7 cm≤a≤12 cm.

20. The secondary battery according to claim 1, wherein 10 cm≤b≤35 cm.

* * * * *